United States Patent [19]

Xu

[11] Patent Number: 5,252,219
[45] Date of Patent: Oct. 12, 1993

[54] COMPRESSED PERMEATE SWEEP MEMBRANE SEPARATION PROCESS

[75] Inventor: Jianguo Xu, Fogelsville, Pa.

[73] Assignee: Permea, Inc., St. Louis, Mo.

[21] Appl. No.: 993,152

[22] Filed: Dec. 18, 1992

[51] Int. Cl.$^5$ .............................................. B01D 61/36
[52] U.S. Cl. ................................... 210/640; 210/644; 210/649; 210/195.2; 210/257.2
[58] Field of Search ............... 210/634, 640, 641, 644, 210/649-653, 195.2, 257.2, 322, 321.6, 321.64, 321.72; 55/16, 158

[56] References Cited

U.S. PATENT DOCUMENTS 4,806,245  2/1989  Böddeker ........................ 210/195.2

*Primary Examiner*—Frank Sever
*Attorney, Agent, or Firm*—Robert J. Wolff; James C. Simmons; William F. Marsh

[57] ABSTRACT

A process is set forth for the separation of one or more, more permeable components from one or more, less permeable components in a feed stream. The process suggests two membrane separation stages in series wherein the feed is introduced into the high pressure side of the first stage, the non-permeate stream from the first stage is introduced into the high pressure side of the second stage and wherein the permeate stream from the second stage is compressed and recycled to the low pressure side of the first stage.

3 Claims, 4 Drawing Sheets

FIG.1 *PRIOR ART*

COMPRESSED PERMEATE SWEEP MEMBRANE SEPARATION PROCESS

TECHNICAL FIELD

The present invention relates to a membrane separation process which uses a plurality of semi-permeable membranes in series for the separation of one or more, more permeable components from one or more, less permeable components in a feed stream. As used herein, the term component generally refers to, but is not limited to, a component in the gaseous state.

BACKGROUND OF THE INVENTION

Membrane separation processes which use a plurality of semi-permeable membranes in series for the separation of one or more, more permeable components from one or more, less permeable components in a feed stream are known in the art. A state of the art example is the "series type two unit separation cell" process as shown in FIG. 1 which recovers both the permeable and non-permeable components at desired purity while using an optimum combination of power and membrane area vis-a-vis any comparable process. Referring now to FIG. 1, a feed stream F2 comprising one or more, more permeable components and one or more, less permeable components is introduced into the high pressure side of membrane separation module M1. M1's high pressure side is separated from its low pressure side by a semipermeable membrane which is selective for the permeation of the more permeable component(s). A first non-permeate stream NP1 which is enriched in the less permeable component(s) of the feed stream is withdrawn from the high pressure side of M1 and introduced into the high pressure side of membrane separation module M2. Similar to M1, M2's high pressure side is separated from its low pressure side by a semi-permeable membrane which is selective for the permeation of the more permeable component(s). A second non-permeate stream NP2 which is further enriched in the less permeable component(s) is withdrawn from the high pressure side of M2 and recovered as a first product stream. A first permeate stream P1 which is enriched in the more permeable component(s) is withdrawn from the low pressure side of M2, combined with the incoming feed stream F1, compressed in compressor C1 and finally recycled to the high pressure side of M1. A second permeate stream P2 which is further enriched in the more permeable component(s) is withdrawn from the low pressure side of M1 as a second product stream.

It is an object of the present invention to recover either or both of the permeable and non-permeable components at desired purity while using an optimum combination of power and membrane area vis-a-vis any comparable process, including the state of the art process shown in FIG. 1.

SUMMARY OF THE INVENTION

The present invention is a process for the separation of one or more, more permeable components from one or more, less permeable components in a feed stream comprising:

(a) introducing the feed stream into a first membrane separation module comprising a high pressure side separated from a low pressure side by a semi-permeable membrane which is selective for the permeation of the more permeable component(s) wherein the feed stream is more specifically introduced into the high pressure side of the first module;

(b) withdrawing from the high pressure side of the first module a first non-permeate stream enriched in the less permeable component(s);

(c) introducing the first non-permeate stream into a second membrane separation module comprising a high pressure side separated from a low pressure side by a semi-permeable membrane which is selective for the permeation of the more permeable component(s) wherein the first non-permeate stream is more specifically introduced into the high pressure side of the second module;

(d) withdrawing from the high pressure side of the second module a second non-permeate stream which is further enriched in the less permeable component(s);

(e) withdrawing from the low pressure side of the second module a first permeate stream enriched in the more permeable component(s);

(f) compressing the first permeate stream and introducing the compressed first permeate stream into the low pressure side of the first module; and (g) withdrawing from the low pressure side of the first module a second permeate stream which is further enriched in the more permeable component(s).

BRIEF DESCRIPTION OF THE DRAWINGS

FIG. 2 is the simplest embodiment of the present invention in that it exclusively comprises steps (a) thru (g) of claim 1.

DETAILED DESCRIPTION OF THE INVENTION

The process of the present invention will be described in detail with reference to the drawings.

Figure 2:
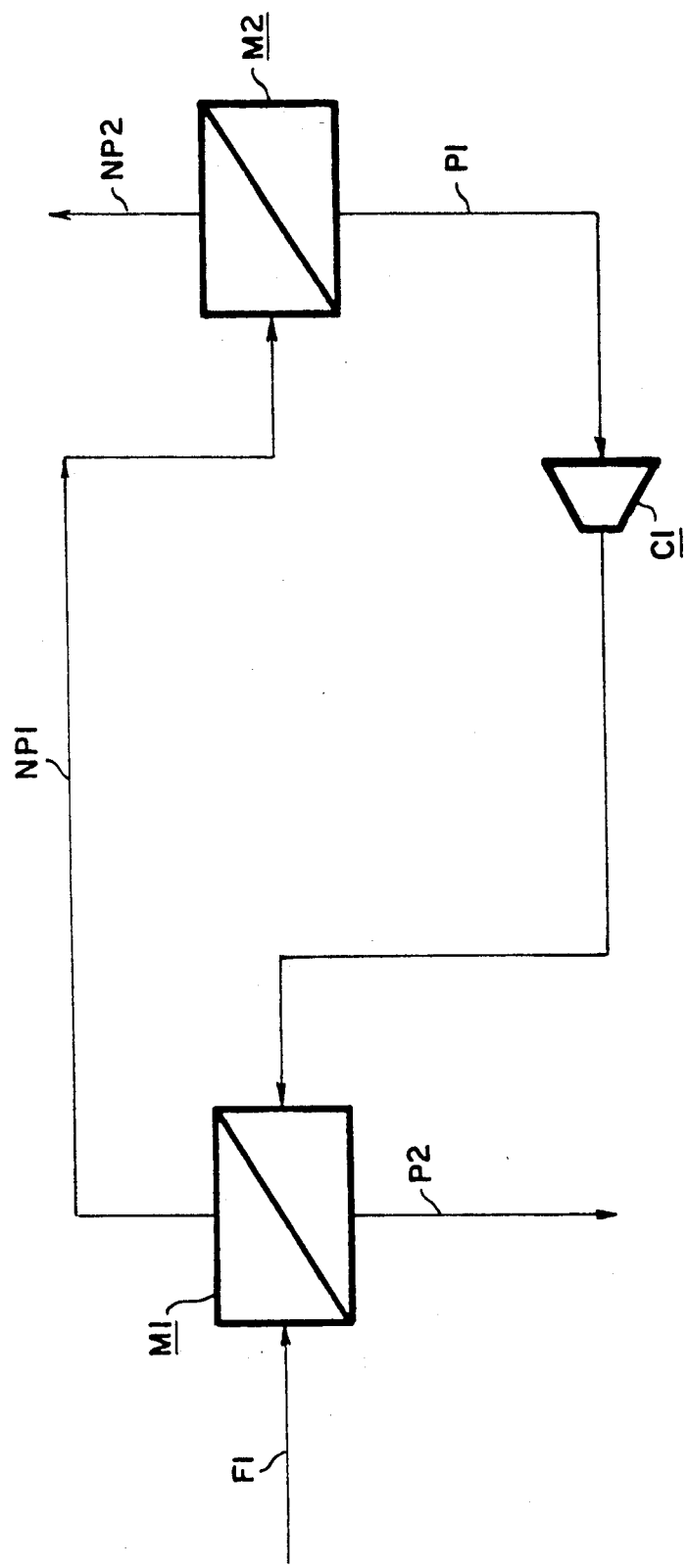
FIG. 2 is a schematic diagram illustrating one embodiment of the present invention.

As noted above, FIG. 2 is the simplest embodiment of the present invention in that it exclusively comprises steps (a) through (g) of claim 1. Referring now to FIG. 2, a feed stream F1 comprising one or more, more permeable components and one or more, less permeable components is introduced into the high pressure side of membrane separation module M1. M1's high pressure side is separated from its low pressure side by a semi-permeable membrane which is selective for the permeation of the more permeable component(s). A first non-permeate stream NP1 which is enriched in the less permeable component(s) of the feed stream is withdrawn from the high pressure side of M1 and introduced into the high pressure side of membrane separation module M2. Similar to M1, M2's high pressure side is separated from its low pressure side by a semi-permeable membrane which is selective for the permeation of the more permeable component(s). Although not shown in FIG. 2, a sweep stream can be introduced into the low pressure side of M2. A second non-permeate stream NP2 which is further enriched in the less permeable component(s) is withdrawn from the high pressure side of M2 and recovered as a first product stream. A first permeate stream P1 which is enriched in the more permeable component(s) is withdrawn from the low pressure side of M2, compressed in compressor C1 and introduced into the low pressure side of M1. A second permeate stream P2 which is further enriched in the more permeable component(s) is withdrawn from the low pressure side of M1 as a second product stream. As shown in FIG. 2, the above described steps are operated as a continuous cycle.

Figure 1:
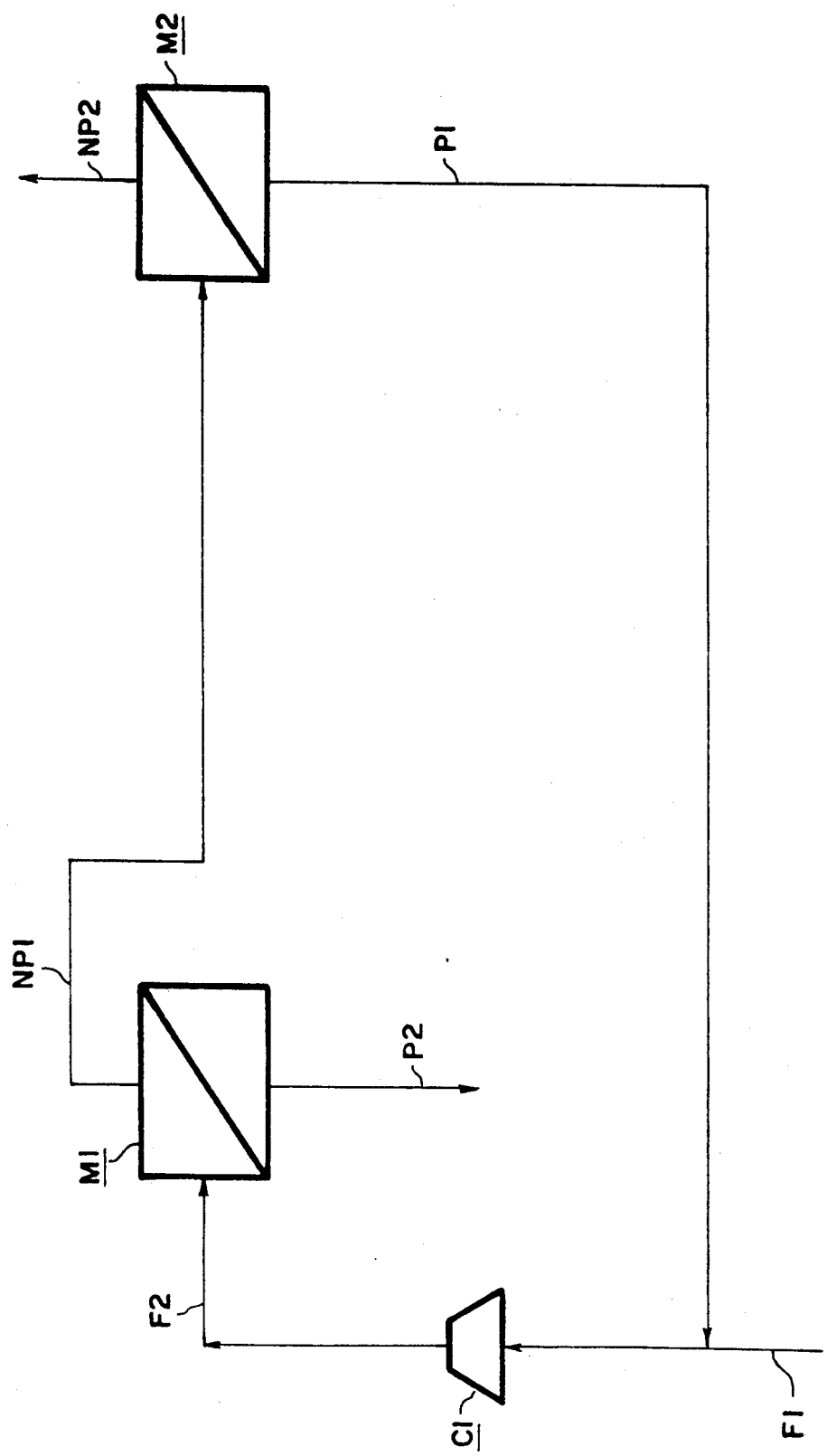
FIG. 1 is a schematic diagram of a prior art process for the separation of one or more, more permeable components from one or more, less permeable components in a feed stream using two membrane separation modules in series.
Figure 3:
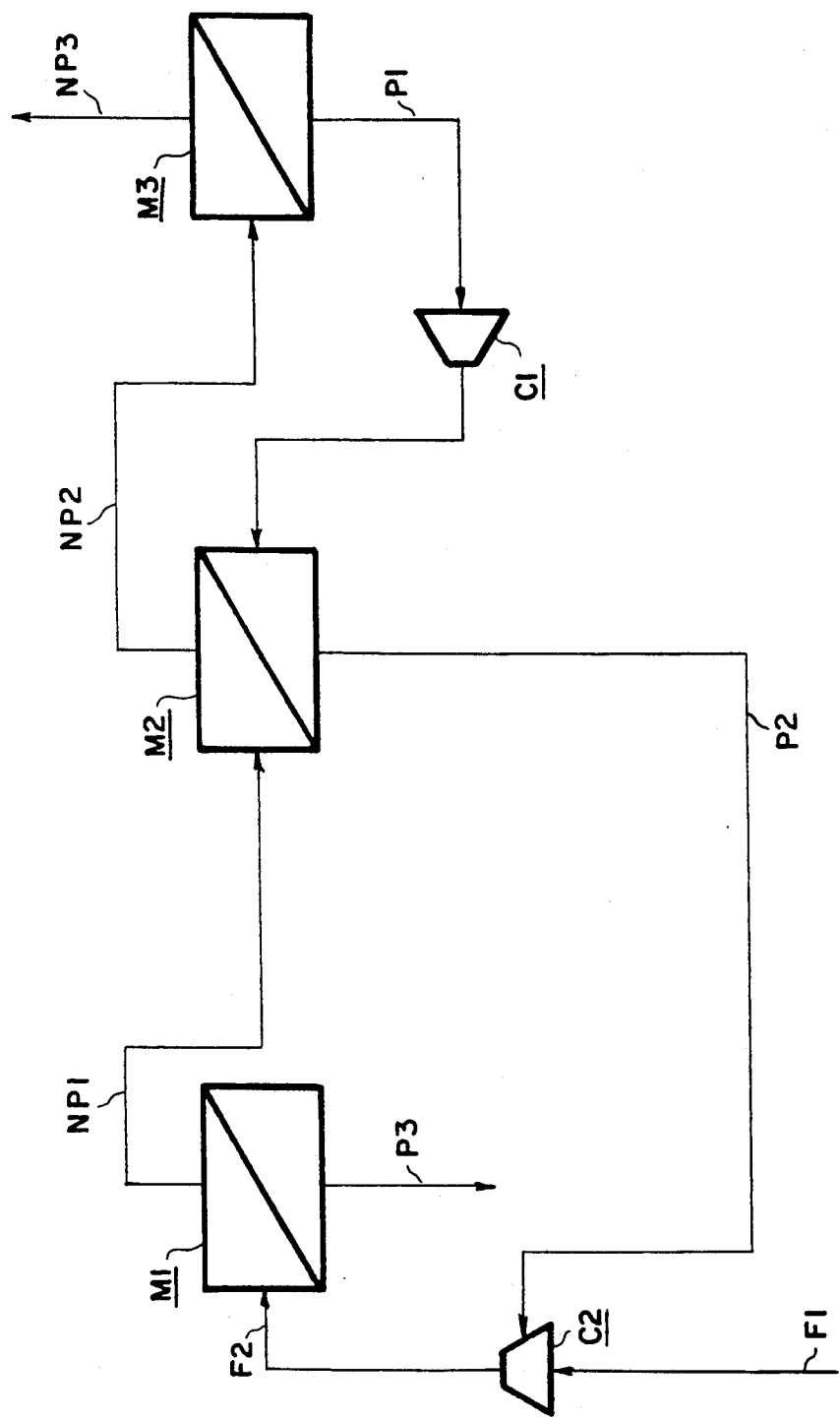
FIG. 3 is a schematic diagram illustrating a second embodiment of the present invention wherein the present invention is incorporated into the process of FIG. 1 in order to improve its energy efficiency.

FIG. 3 is a schematic diagram illustrating a second embodiment of the present invention wherein the present invention is incorporated into the process of FIG. 1 in order to improve its energy efficiency as will be shown in the Example. FIG. 3 is identical to FIG. 1 except that a third membrane separation module M3 has been added in series to FIG. 1's M2 such that their combination meets the terms of the process of the present invention. In effect, FIG. 3 divides FIG.1's M2 into two stages. Referring now to FIG. 3, a feed stream F2 comprising one or more, more permeable components and one or more, less permeable components is introduced into the high pressure side of the first membrane separation module M1. M1's high pressure side is separated from its low pressure side by a semi-permeable membrane which is selective for the permeation of the more permeable component(s). A first non-permeate stream NP1 which is enriched in the less permeable component(s) of the feed stream is withdrawn from the high pressure side of M1 and introduced into the high pressure side of membrane separation module M2. Similar to M1, M2's high pressure side is separated from its low pressure side by a semi-permeable membrane which is selective for the permeation of the more permeable component(s). A second non-permeate stream NP2 which is further enriched in the less permeable component(s) is withdrawn from the high pressure side of M2 and introduced into the high pressure side of M3. Similar to M1 and M2, M3's high pressure side is separated from its low pressure side by a semi-permeable membrane which is selective for the permeation of the more permeable component(s). Although not shown in FIG. 3, a sweep stream can be introduced into the low pressure side of M3. A third non-permeate stream NP3 which is still further enriched in the less permeable component(s) is withdrawn from the high pressure side of M3 and recovered as a first product stream. A first permeate stream P1 which is enriched in the more permeable component(s) is withdrawn from the low pressure side of M3, compressed in compressor C1 and introduced into the low pressure side of M2. A second permeate stream P2 which is further enriched in the more permeable component(s) is withdrawn from the low pressure side of M2, combined with the incoming feed stream F1 at an intermediate stage of compressor C2 and finally recycled to the high pressure side of M1. A third permeate stream P3 which is still further enriched in the more permeable component(s) is withdrawn from the low pressure side of M1 as a second product stream.

Figure 4:
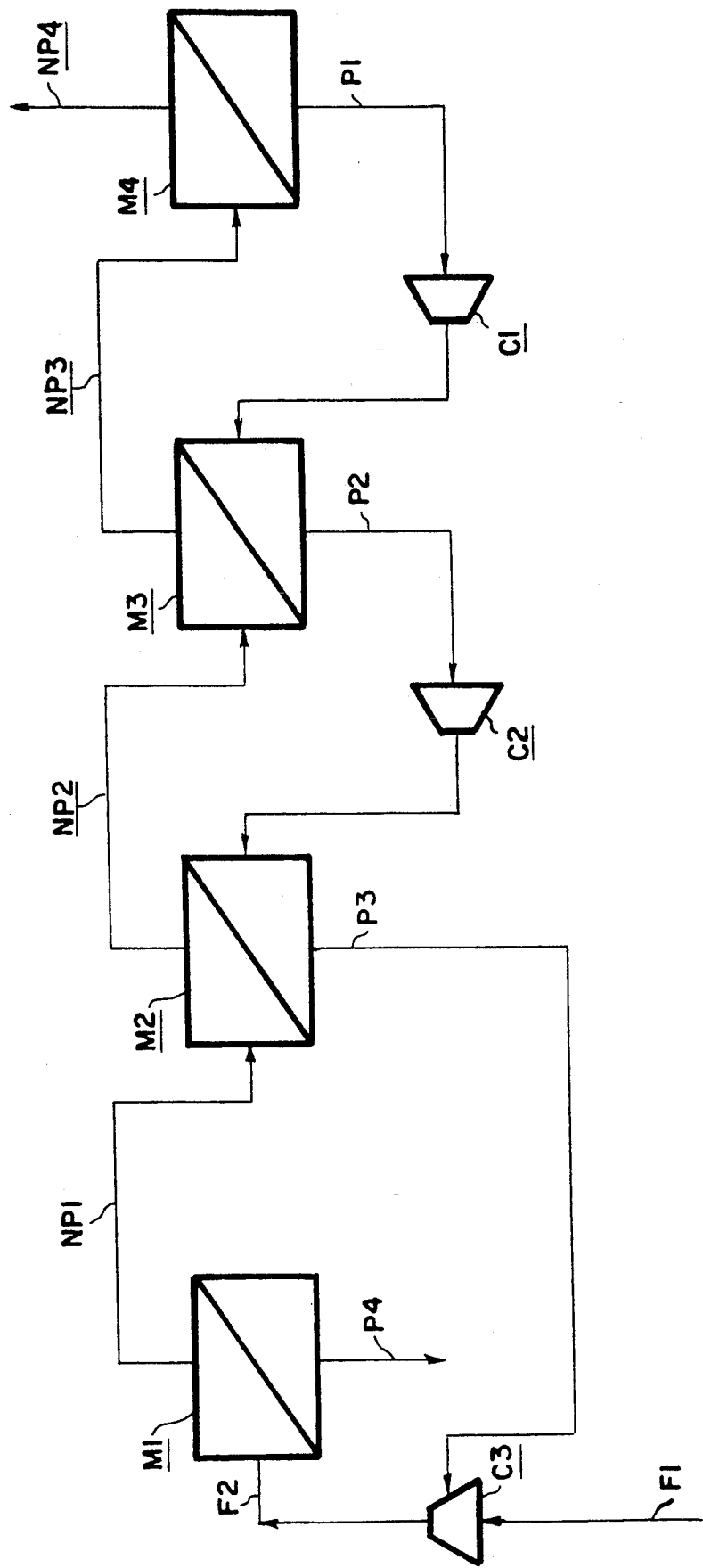
FIG. 4 is a schematic diagram illustrating a third embodiment of the present invention wherein the present invention is twice incorporated into the process of FIG. 1.

FIG. 4 is a schematic diagram illustrating a third embodiment of the present invention wherein the present invention is twice incorporated into the process of FIG. 1. FIG. 4 is identical to FIG. 3 except that an additional membrane separation module M4 has been added in series with FIG. 3's M3 such that their combination also meets the terms of the process of the present invention. In effect, whereas FIG. 3 divided FIG. 1's M2 into two stages, FIG. 4 divides FIG. 1's M2 into three stages. The present invention as defined in claim 1 places no limitations on the number of times it may be repeated in a particular process. In the context of FIG. 1, this means there is no limitation on the number of stages that M2 (and/or M1 for that matter) can be divided into. In practice however, the increase in compressor cost may limit the resulting number of stages. Referring now to FIG. 4, a feed stream F2 comprising one or more, more permeable components and one or more, less permeable components is introduced into the high pressure side of the first membrane separation module M1. M1's high pressure side is separated from its low pressure side by a semi-permeable membrane which is selective for the permeation of the more permeable component(s). A first non-permeate stream NP1 which is enriched in the less permeable component(s) of the feed stream is withdrawn from the high pressure side of M1 and introduced into the high pressure side of membrane separation module M2. Similar to M1, M2's high pressure side is separated from its low pressure side by a semi-permeable membrane which is selective for the permeation of the more permeable component(s). A second non-permeate stream NP2 which is further enriched in the less permeable component(s) is withdrawn from the high pressure side of M2 and introduced into the high pressure side of M3. Similar to M1 and M2, M3's high pressure side is separated from its low pressure side by a semi-permeable membrane which is selective for the permeation of the more permeable component(s). A third non-permeate stream NP3 which is still further enriched in the less permeable component(s) is withdrawn from the high pressure side of M3 and introduced into the high pressure side of M4. Similar to M1, M2, and M3, M4's high pressure side is separated from its low pressure side by a semi-permeable membrane which is selective for the permeation of the more permeable component(s). Although not shown in FIG. 4, a sweep stream can be introduced into the low pressure side of M4. A fourth non-permeate stream NP4 which is yet further enriched in the less permeable component(s) is withdrawn from the high pressure side of M4 and recovered as a first product stream. A first permeate stream P1 which is enriched in the more permeable component(s) is withdrawn from the low pressure side of M4, compressed in compressor C1 and introduced into the low pressure side of M3. A second permeate stream P2 which is further enriched in the more permeable component(s) is withdrawn from the low pressure side of M3, compressed in compressor C2 and introduced into the low pressure side of M2. A third permeate stream P3 which is still further enriched in the more permeable component(s) is withdrawn from the low pressure side of M2, combined with the incoming feed stream F1 at an intermediate stage of compressor C3 and finally recycled to the high pressure side of M1. A fourth permeate stream P3 which is yet further enriched in the more permeable component(s) is withdrawn from the low pressure side of M1 as a second product stream.

The following example is offered to demonstrate the efficacy of the present invention.

EXAMPLE

The purpose of this example is to demonstrate the improved energy efficiency of the present invention (as embodied in FIG. 3) over the prior art (as embodied in FIG. 1). This was accomplished by performing computer simulations for FIG'S. 1 and 3. Table 1 summarizes the common feed and product streams for the two simulations, Table 2 summarizes the common membrane characteristics for the two simulations and Table 3 summarizes the compressor inlet and outlet pressures for each simulation Both simulations assume zero pressure drops in their respective systems as well as a counter-current flow pattern between the flows on the high pressure side and low pressure side of each separation module. Note that per Table 2, the selectivities for the membrane separation modules is consistent with the teaching that it is often advantageous to use different selectivities (and thus different permeabilities since permeability decreases as selectivity increases) in a multi-stage membrane separator system. Table 4 summarizes the relative power and membrane area for the two simulations. As shown in Table 4, FIG. 3 enjoys a 24% advantage in energy efficiency over FIG. 1 at the expense of a 58% increase in membrane area.

TABLE 1

|  | Flow (lbmoles/hr) | Pressure (psia) | Composition (mole %) | |
|---|---|---|---|---|
|  |  |  | Hydrogen | Carbon Monoxide |
| Feed Stream | 100.0 | 22.7 | 21.5 | 78.5 |
| Permeate Product | 21.3 | 41.7 | 99.0 | 1.0 |
| Non-Permeate Product | 78.7 | 402.7 | 0.5 | 99.5 |

TABLE 2

|  | Selectivity | Permeability of Hydrogen (standard $cm^3/cm^2 \cdot sec \cdot cm\ Hg$) |
|---|---|---|
| Module M1 (FIGS. 1 and 3) | 100 | $21.67 \times 10^{-6}$ |
| Module M2 (FIGS. 1 and 3) | 38 | $95 \times 10^{-6}$ |
| Module M3 (FIG. 3 only) | 38 | $95 \times 10^{-6}$ |

TABLE 3

|  | Inlet Pressure (psia) | Outlet Pressure (psia) |
|---|---|---|
| Compressor C1 in FIG. 1 | 22.7 | 402.7 |
| Compressor C1 in FIG. 3 | 22.7 | 100.0 |
| Compressor C2 in FIG. 3 | 22.7 | 402.7 |

TABLE 4

|  | Relative Power | Relative Membrane Area |
|---|---|---|
| FIG. 1 | 1.00 | 1.00 |
| FIG. 3 | 0.76 | 1.58 |

The present invention has been described with reference to three specific embodiments thereof. These embodiments should not be seen as a limitation of the scope of the present invention; the scope of such being ascertained by the following claims.

What is claimed is:

1. A process for the separation of one or more, more permeable components from one or more, less permeable components in a feed stream comprising:
   recovering either or both permeable and non-permeable components at predetermined purity while using an optimum combination of power and membrane area by,
   (a) introducing the feed stream into a first membrane separation module comprising a high pressure side separated from a low pressure side by a semi-permeable membrane which is selective for the permeation of the more permeable component(s) wherein the feed stream is more specifically introduced into the high pressure side of the first module;
   (b) withdrawing from the high pressure side of the first module a first non-permeate stream enriched in the less permeable component(s);
   (c) introducing the first non-permeate stream into a second membrane separation module comprising a high pressure side separated from a low pressure side by a semi-permeable membrane which is selective for the permeation of the more permeable component(s) wherein the first non-permeate stream is more specifically introduced into the high pressure side of the second module;
   (d) withdrawing from the high pressure side of the second module a second non-permeate stream which is further enriched in the less permeable component(s);
   (e) withdrawing from the low pressure side of the second module a first permeate stream enriched in the more permeable component(s);
   (f) compressing the first permeate stream and introducing the compressed first permeate stream into the low pressure side of the first module; and
   (g) withdrawing from the low pressure side of the first module a second permeate stream which is further enriched in the more permeable component(s).

2. The process of claim 1 wherein steps (a) through (g) are operated as a continuous cycle.

3. The process of claim 1 wherein the selectivity towards the more permeable component(s) of the semi-permeable membrane in the first module is different than the selectivity towards the more permeable component(s) of the semi-permeable membrane in the second module.

* * * * *